US008320023B2

(12) United States Patent
Takahashi et al.

(10) Patent No.: US 8,320,023 B2
(45) Date of Patent: Nov. 27, 2012

(54) COLOR IMAGE FORMING APPARATUS AND CONTROL METHOD OF THE SAME

(75) Inventors: Atsushi Takahashi, Akishima (JP); Youbao Peng, Hino (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 601 days.

(21) Appl. No.: 12/495,921

(22) Filed: Jul. 1, 2009

(65) Prior Publication Data

US 2010/0002266 A1 Jan. 7, 2010

(30) Foreign Application Priority Data

Jul. 4, 2008 (JP) ................................ 2008-175123

(51) Int. Cl.
*H04N 1/40* (2006.01)

(52) U.S. Cl. ........................................ 358/3.1; 358/406

(58) Field of Classification Search .................. 358/2.1, 358/504, 3.1, 3.11–3.12, 406, 3.24, 3.27
See application file for complete search history.

(56) References Cited

U.S. PATENT DOCUMENTS

| | | | |
|---|---|---|---|
| 5,894,353 | A | 4/1999 | Hotta et al. |
| 2003/0090693 | A1 | 5/2003 | Tezuka et al. |
| 2008/0056737 | A1 | 3/2008 | Flemming et al. |

FOREIGN PATENT DOCUMENTS

| | | | |
|---|---|---|---|
| EP | 0 772 345 | | 5/1997 |
| EP | 1 260 877 | | 11/2002 |
| JP | 10-175330 | A | 6/1998 |
| JP | 2001-086297 | A | 3/2001 |
| JP | 2003-149903 | A | 5/2003 |
| JP | 2004-110018 | A | 4/2004 |
| JP | 2005-292369 | A | 10/2005 |
| JP | 2006-071816 | A | 3/2006 |
| JP | 2006-235490 | A | 9/2006 |
| JP | 2006-308888 | A | 9/2006 |

OTHER PUBLICATIONS

European Search Report issued in corresponding Application No. 09164142.3-2209 dated Oct. 19, 2009.

Notice of Reasons for Refusal drafted by the Japanese Patent Office on May 25, 2012, in corresponding Japanese Patent Application No. 2008-175123, and an English translation thereof.

*Primary Examiner* — Thomas D Lee
*Assistant Examiner* — Stephen M Brinich
(74) *Attorney, Agent, or Firm* — Buchanan Ingersoll & Rooney PC

(57) ABSTRACT

The detected surface (patch section) of the sheet Ps for detection, the bulkhead plate 91 and the density calibration reference section 99 fall within the focus depth L' of the color density sensor 80. The opening section 74 of the ejection side conveyance path 70 is covered except at color density detection so that heat and vapor of oil and wax originated form the sheet P through the fixing process do not reach color density sensor side.

7 Claims, 8 Drawing Sheets

COLOR IMAGE FORMING APPARATUS AND CONTROL METHOD OF THE SAME

This application is based on Japanese Patent Application No. 2008-175123 filed on Jul. 4, 2008, in Japanese Patent Office, the entire content of which is hereby incorporated by reference.

TECHNICAL FIELD

The present invention relates to a color image forming apparatus and a control method thereof, and in particular to an image forming apparatus provided with a color density sensor and a control method thereof.

BACKGROUND

In recent years, preservation and stabilization of color image quality and uniformity of the color image quality among a plurality of individual color image forming apparatuses are increasingly-demanded for color image forming apparatuses. The stability of color density is particularly desired, without being affected by an installation environment, deterioration with age and differences between apparatuses. Hereinafter, differences among apparatuses are referred as individual differences.

Conventionally, as a color density sensor to detect the color density, there is a senor that light beams from a light source is radiated to a specific reflection area of a surface of a measured object such as a sheet, and the light beams reflected within a predetermined angle range, among the light beams reflected by the reflection area, enter to a photoelectric conversion element through a lens. For example, Patent Document 1: unexamined Japanese patent application publication No. H10-175330 discloses the above color sensor. From an output of the photoelectron conversion element by receiving the light, a color density of a toner image for density detection formed by toner of each color is measured. Meanwhile, the above color density sensor enables accurate detection by arranging the light source, the lens and the measured object in predetermined optical position relations, though the measured object is displaced slightly in a direction perpendicular to a conveyance direction of the measured object.

As a calibration method of color density measured by the above color density sensor, there is a method that reflection ratios of a calibration plate and a calibration comparison plate are obtained, and a rate in respect to reference white color such as white color of a sheet used in an actual apparatus is stored so as to perform correction of the individual difference as an initial calibration. Namely, in the above calibration method, by defining white color reference using white color of the sheet, another white color reference plate is not use. For example, there is a description related to the above color density calibration method in Patent Document 2: unexamined Japanese patent application publication No. 2001-86297.

Also, Patent Document 3: unexamined Japanese patent application publication No. 2006-235490 discloses a color image forming apparatus omitting the white color reference plate to cope with a problem that the white color plate is tainted by paper powder and toner.

Further, as another calibration method using a while portion of a transfer material as the white color reference plate, to eliminate effects of variation of the white portion of the sheet, there is know a method to correct a sensor output in accordance with shading of the toner when the toner density is low. For example, the description related to a correction method of the sensor output is in Patent Document 4: unexamined Japanese patent application publication No. 2003-149903.

Patent Document 1: unexamined Japanese patent application publication No. H10-175330

Patent Document 2: unexamined Japanese patent application publication No. 2001-86297

Patent Document 3: unexamined Japanese patent application publication No. 2006-235490 is omitted Patent Document 4: unexamined Japanese patent application publication No. 2003-149903.

In the each one of the above convention technologies, the color sensor had problems such that there is occurred deterioration with age by being exposed in vapor of oil and wax from the sheet, and the light receiving element is affected by heat radiated from the sheet resulting in an adverse effect on an output characteristic. Namely, in the image forming apparatus employing a thermal compression fixing method to fix an image, if the color density sensor is disposed at a downstream side of the fixing section to perform a fixing process, the color density sensor tends to be subject to the deterioration with age and the adverse affect on output characteristic as described above.

An object of the present invention is to enhance detection accuracy of the color density sensor equipped in the color image forming apparatus by suppressing a thermal effect from the sheet having passed through the fixing section to perform the fixing process and taint caused by being exposed in the vapor of oil or wax. Also, by enhancing the detection accuracy, the other object of the present invention is to provide the color image forming apparatus having a high stability in the color density of a formed image, without being affected by the installation environment, the deterioration with age and the individual difference and a control method of the apparatus thereof.

SUMMARY

To achieve the above object, the image forming apparatus to carry out color density correction by detecting a toner image for density detection formed on a sheet by a color density sensor, includes: a color image forming section to form the toner image for density detection; a fixing section to fix the toner image for density detection formed by the color image forming section by heat; a conveyance path to pass the sheet having been subject to a fixing process by the fixing section, having an exposure area though which a color density sensor side of the sheet is exposed; a bulkhead plate having a density calibration reference section at least at a portion of the color density sensor side; a bulkhead plate drive section to drive the bulkhead plate so as to displace between a regular state position to cover the exposure area and a sheet detection state position to expose the exposure area, wherein the bulkhead plate locates at the sheet detection state position so that the color density sensor detects the toner image for density detection; a light emitting element disposed outside the conveyance path to radiate light towards the sheet; a light receiving element to receive reflected light caused by radiation of the light; and a color density sensor to detect color density of the toner image for density detection on the sheet in the exposure area when the bulkhead plate is in the sheet detection state position, and to detect density of the density calibration reference section when the bulkhead is in the regular state position.

According to the above image forming apparatus, by shielding the vapor of oil and wax form the surface of the sheet through the fixing section of thermal pressure method, exposure of a color density sensor side in the vapor and effect of heat from the sheet side are avoided. Thus, taint of the color density sensor and an unstable output characteristic due to fluctuation of temperature can be suppressed. Therefore, stable performance of the color density sensor can be preserved. Also, since the color density sensor can detect the density calibration reference section and density information thereof can be used, white color of the sheet is not necessary to be used as a reference section, whereby highly accurate density detection without being affected by the sheet is possible. In the above, since the density calibration reference section is located at the color density sensor side of the bulkhead plates, the density calibration reference section is not regularly exposed in the vapor and, and deterioration of the reference section can be suppressed. Whereby, since the density calibration reference section is disposed at a part of the bulkhead plate at least, number of parts can be reduced and a low cost configuration can be realized.

Also, a control method of the aforesaid image forming apparatus includes: reading color density information of the density calibration reference section based on a command to carry out color density correction; moving the bulkhead plate from the regular state position to sheet detection state position by detecting arrival of the sheet having been subject to the fixing process by the fixing section at the conveyance path; reading color density information of the image for density detection formed in a position corresponding to the exposure area; and correcting color density based on the color density information of the density calibration reference section and the color information of the toner image for density detection.

According to the above control method, when a predetermined time for color density correction comes or number of copied sheets reach a predetermined number of sheets, color density detection for the density calibration reference section is carried out by the color density sensor. The above color density detection is carried out in a state where the bulkhead plate covers the exposure area. Before and after the above color density detection of the density calibration reference section, whether or not the sheet for detection is conveyed to a predetermined position of the conveyance path via the fixing section is detected. If the sheet for detection is in the predetermined position, color density of the toner image for density detection formed on the sheet for detection is detected. In the above control method, color density correction at image forming is carried out based on the detected result of the above color density.

DETAILED DESCRIPTIONS OF PREFERRED EMBODIMENTS

Figure 1:
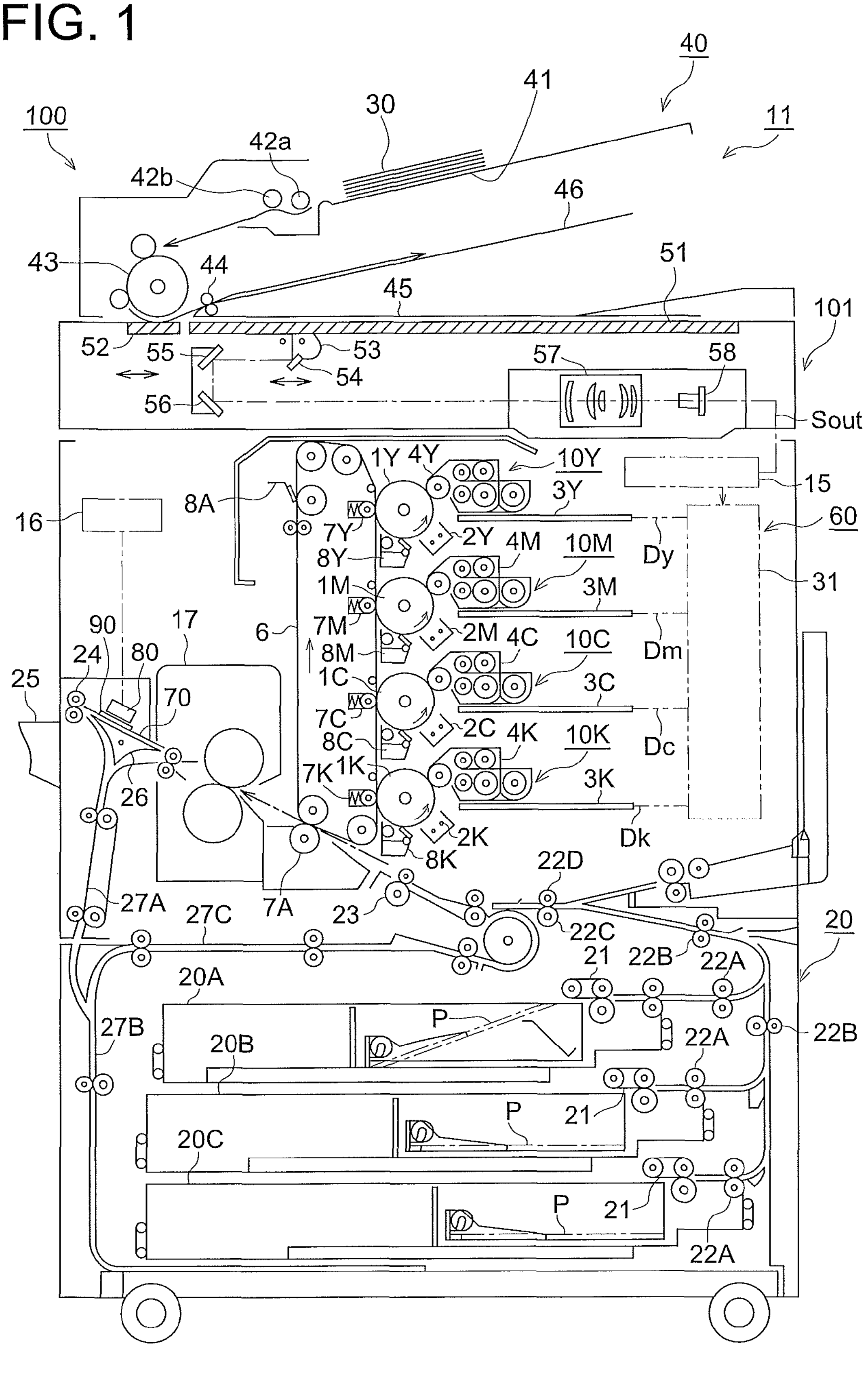
FIG. 1 is a perspective view showing an interior structure of a color copying machine related to a first embodiment of the present invention.

A color image forming apparatus related to an embodiment of the present invention and a control method thereof will be described in details with reference to the drawings. Meanwhile, the drawings are frame formats only and proportion in dimensions of each member is different from actual one.

First Embodiment

FIG. 1 to FIG. 7 show a color copying machine representing a color image forming apparatus related to the first embodiment of the present invention and a control method thereof (color copying machine).

The color copying machine related to the present embodiment is provided with a color density sensor 80 and a shutter section 90 having a reference section 99 for density calibration outside an ejection side conveyance path 70 representing a conveyance path at a downstream side of a fixing section 17. Meanwhile, in the present embodiment, as an example of outside of the ejection side conveyance path 70, a case where the color density sensor 80 and the shutter section 90 are disposed above the ejection side conveyance path 70 will be described, however the color density sensor 80 and the shutter section 90 can be disposed on the downside the ejection side conveyance path 70.

Here, prior to describing the relevant portions of the color copying machine related to the present embodiment, an outline of an interior structure of a color copying machine 100 will be described with reference to FIG. 1.

The color copying machine 100 is an example of the color image forming apparatus. The color copying machine 100 acquires image information by reading a color image formed on a document 30, and forms images of colors on the photoconductive drums 1Y, 1M, 1C and 12K respectively based on the image information, thereafter forms an image by overlapping colors on a sheet P. An image formed on the sheet P outputted form the color copying machine 100 is called "outputted image". The color image forming apparatus of the embodiment can be applied for a printer, a facsimile machine and a multi function peripheral thereof, besides the color copying machine 100 related to the present embodiment.

<Image Input Section and Automatic Document Conveyance Apparatus>

The color copying machine 100 is provided with a copying machine main body 101. The copying machine main body 101 is so called a tandem type color image forming apparatus. At an upper part of the copying machine main body 101, an image input section 11 and an automatic document feeding apparatus 40 are disposed. Hereinafter, the automatic document feeding apparatus is called "ADF". The ADF 40 operates to perform automatic sheet feeding of a single document or a plurality of documents 30 placed on the ADF 40 at automatic sheet feeding mode. Hereinafter, automatic sheet feeding mode is called ADF mode. The ADF mode means an action where the document 30 placed on the ADF 40 is automatically fed so that a document image is automatically read.

The ADF 40 is provided with a document placing section 41, a roller 42*a*, a roller 42*b*, a roller 43, conveyance rollers 44 and a sheet ejection try 46. On the document placing section 41, one or a plurality of documents 30 are placed. At a downstream side of the document placing section 41, the roller 42*a* and the roller 42*b* are disposed. When the ADF mode is selected, the document 30 fed from the document placing section 41 is bent and conveyed in a U-shape by the roller 43. Meanwhile, in case the ADF mode is selected, the document 30 is placed on the document placing section 41 with a recorded surface up.

The image input section 11 operates to read the color image formed on the document 30. The image input section 11 employs, for example, a slit scan type scanner for natural color. The image input section 11 is provided with image sensors 58 disposed in an array so as to read the surface of the document 30 and an image read signal Sout is outputted, for example, when it is turned over in the U-shape by the roller 43 at the ADF mode. As the image sensor 58, for example, a three-line-color CCD imaging device is used. Here, the CCD is an abbreviation of a charge-coupled device.

The image sensor 58 is provided with three read-out sensors to detect red, green and blue colors which are configured with a plurality of light receiving element arrays disposed in a main scanning direction. Hereinafter, red, green and blue are denoted by R, G and B respectively. The three read-out sensors divide pixels in different positions in a sub-scanning direction which is perpendicular to the main canning direction so as to read optical information of R, G and B colors simultaneously.

The document 30 read in the image input section 11 is conveyed by the conveyance rollers 44 and ejected to the sheet ejection tray 46. Also, the image sensor 58 outputs an image read-out signal of RGB system obtained by reading the document 30 at a platen mode. Here, the platen mode means a mode where document image read-out is automatically carried out by scanning the document 30 placed on the platen glass through the optical drive system.

The image input section 11 is provided with a first platen glass 51, a second platen glass 52, a light source 53, mirrors 54, 55 and 56, an imaging optical section 57 and an unillustrated optical system drive section. The light source 53 radiates light on the document 30. The optical system drive section operated to move the image sensor 58 in the sub-scanning direction relatively. The mirrors 54 to 56 are disposed to fold back the light reflected by the document 30, and the imaging optical section 57 leads the light folded back to the image sensor 58 to form an image on the image sensor 58. As above, the document 30 placed on the document placing section 41 of the ADF 40 is conveyed through the rollers 42*a*, 42*b*, 43 and conveyance roller 44, and one side or both sides of the document 30 is/are subject to scanning exposure through the optical system of the image input section 11, then the reflected light representing the image information of the document 30 is read through the image sensor 58. Here, the optical system of the image input section 11 includes the light source 53, the mirrors 54, 55 and 56, the imaging optical section 57 and the optical system drive section.

The image sensor 58 performs photoelectric conversion in accordance with the light amount of an incident light. An analogue image reading signal processed by photoelectric conversion is subject to A/D conversion in the image input section 11 and a digital image reading signal Sout is outputted form the image input section 11. To the image input section 11, the image processing section 31 is connected via a total control section 15. In the image processing section 31, the digital image reading signal Sout is subject to image compression processing, magnification processing and so forth to be digital image data of R, G and B color elements. Further, the image processing section 31 converts the image data into image data Dy, Dm, Dc and Dk for yellow, magenta, cyan and black colors using a three-dimensional color information conversion table, then the image data Dy, Dm, Dc and Dk after the color conversion is transferred to write units 3Y, 3M, 3C and 3K configuring the image forming section 60. Meanwhile, yellow, magenta, cyan and black are denoted by Y, M, C and BK respectively.

<Image Forming Section>

The image forming section 60 is disposed in the copying machine main body 101. The image forming section 60 forms a color image based on the image data Dy, Dm, Dc and Dk obtained through the image input section 11 by reading. The image forming section 60 is provided with a plurality of image forming units 10Y, 10M, 10C and 10K having the photoconductive drums 1Y, 1M, 1C and 1K for each color Y, M, C, and BK, an intermediate transfer member 6 in a shape of an endless loop, and a fixing section 17 representing a fixing section to fix the toner image transferred onto the sheet from the intermediate transfer member 6.

The image forming unit 10Y to form a Y color image is provided with a photoconductive drum 1Y representing an image forming member to form the Y color toner image, a charging section 2Y for Y color, a writing unit 3Y, a developing section 4Y and a cleaning section 8Y for the image forming member each disposed at a periphery of the photoconductive drum 1Y.

The image forming unit 10M to form a M color image is provided with a photoconductive drum 1M representing an image forming member to form the M color toner image, a charging section 2M for M color, a writing unit 3M, a developing section 4M and a cleaning section 8M for the image forming member.

The image forming unit 10C to form a C color image is provided with a photoconductive drum 1C representing an image forming member to form the C color toner image, a charging section 2C for C color, a writing unit 3C, a developing section 4C and a cleaning section 8C for the image forming member.

The image forming unit 10K to form a BK color image is provided with a photoconductive drum 1K representing an image forming member to form the BK color toner image, a charging section 2K for BK color, a writing unit 3K, a developing section 4K and a cleaning section 8K for the image forming member.

The charging section 2Y and writing unit 3Y, the charging section 2M and the writing unit 3M, the charging section 2C and the writing unit 3C, and the charging section 2K and the writing unit 3K, forms electrostatic latent images on each photoconductive drum 1Y, 1M, 1C and 1K based on image data Dy, Dm, Dc and Dk respectively. Each of the writing units 3Y, 3M, 3C and 3K is a fixed type scanning writing unit in which a plurality of optical modulation elements are disposed on a line in a main scanning direction perpendicular to a conveyance direction of the sheet on which an image is to be formed, and in the present invention, a LED array head optical system employing LED as the optical modulation element is used. The conveyance direction of the sheet is corresponding to the sub-scanning direction.

The developing sections 4Y, 4M, 4C and 4K develop latent images on the photoconductive drums 1Y, 1M, 1C and 1K to from toner images of Y color, M color, C color and BK color. Development performed by the developing section 4Y, 4M, 4C and 4K is a reversal development where a developing bias is applied. In the developing bias, an alternate current voltage is superimposed on a direct current voltage having the same polarity as that of the toner used, for example, a negative polarity.

The intermediate transfer member 6 is supported rotatably by a plurality of rollers. The primary transfer rollers 7Y, 7M, 7C and 7K are disposed at positions to opposing to the photoconductive drums 1Y, 1M, 1C and 1K having the intermediate transfer member 6 in between. By applying the primary transfer bias voltage having the opposite polarity to the toner used, for example, positive polarity onto the first transfer rollers 7Y, 7M, 7C and 7K, the toner images of Y color, M color, C color and BK color formed on the photoconductive drums 1Y, 1M, 1C and 1K are transferred onto the rotating intermediate transfer member 6 subsequently. Whereby, a color toner image on which the toner images of each color are overlapped is formed on the intermediate transfer member 6 through the first transfer. A sheet P conveyed from the conveyance section 20 to be described later is further conveyed to the second transfer roller 7A, then the color toner image formed on the intermediate transfer member 6 is collectively transferred onto a surface, for example, an obverse surface of the sheet P from the intermediate transfer member 6 through the second transfer.

Fixing section 17 utilizes a thermal pressure method to perform fixing processing where by applying heat and pressure onto the sheet P having a transferred color toner image, the toner on the sheet P is adhered. The sheet P after fixing processing is grasped by a pair of the sheet ejection rollers 24 disposed at a downstream side of an ejection side conveyance path 70 to be described. The residual toner remaining on periphery surfaces of the photoconductive drums 1Y, 1M, 1N and 1K are removed by the cleaning sections 8Y, 8M, 8*c* and 8K to be ready for next image forming cycle.

<Conveyance Section>

Also, on a lower side of the image forming section 60, a conveyance section 20 is disposed to convey the sheet P to the image forming section 60. The conveyance section 20 is provided with, for example, three sheet feeding trays 20A, 20B and 20C to store the sheet P. The sheet P stored in the sheet tray 20A is fed by sending out rollers 21 and sheet feeding rollers 22A disposed at the sheet feeding tray 20A, and conveyed to the second transfer roller 7A through the conveyance rollers 22B, 22C, 22*d* and a registration roller 23, then the color toner image is transferred onto, for example, one surface of the sheet P, for example, an obverse surface from the intermediate transfer member 6 collectively through second transfer. As above, the sheet P to which the color toner image has been transferred is led to the fixing section 17 to be subject to the fixing processing by the thermal pressure method.

Meanwhile, when the images are formed on both surfaces of the sheet P, after the image is formed on one surface, the sheet P ejected from the fixing section 17 is diverted from the sheet ejection path by the diverging section 26. Next, the sheet P through the circulating section 27A at lower side is turned over upside down by the reversal conveyance path 27B representing the sheet re-feeding mechanism, then passes through the sheet re-feeding conveyance section 27C and merges with the aforesaid transfer path from the conveyance roller 22D.

The sheet P conveyed upside down and passed through the registration roller 23 is conveyed to the second transfer roller 7A again, so as to collectively transfer the color image onto the reverse side of the sheet P. On the other hand, after transferring the color image on the sheet P by the second transfer roller 7A, the residual toner on the intermediate transfer member 6, from which the sheet P is separated by curvature, is remove by the cleaning section 8A for the intermediate transfer belt.

<Ejection Side Conveyance Path, Color Density Sensor and Shutter Section>

The color density sensor 80 and the shutter section 90 are disposed at an upper side of the ejection side conveyance path 70 which conveys the sheet Ps for detection after the fixing process to the sheet ejection tray 25. Meanwhile, the sheet Ps for detection is the sheet P on which a toner image for density detection is to be formed at a timing of color density detection to be described. Hereinafter, the toner image for density detection is called a patch.

Figure 2:
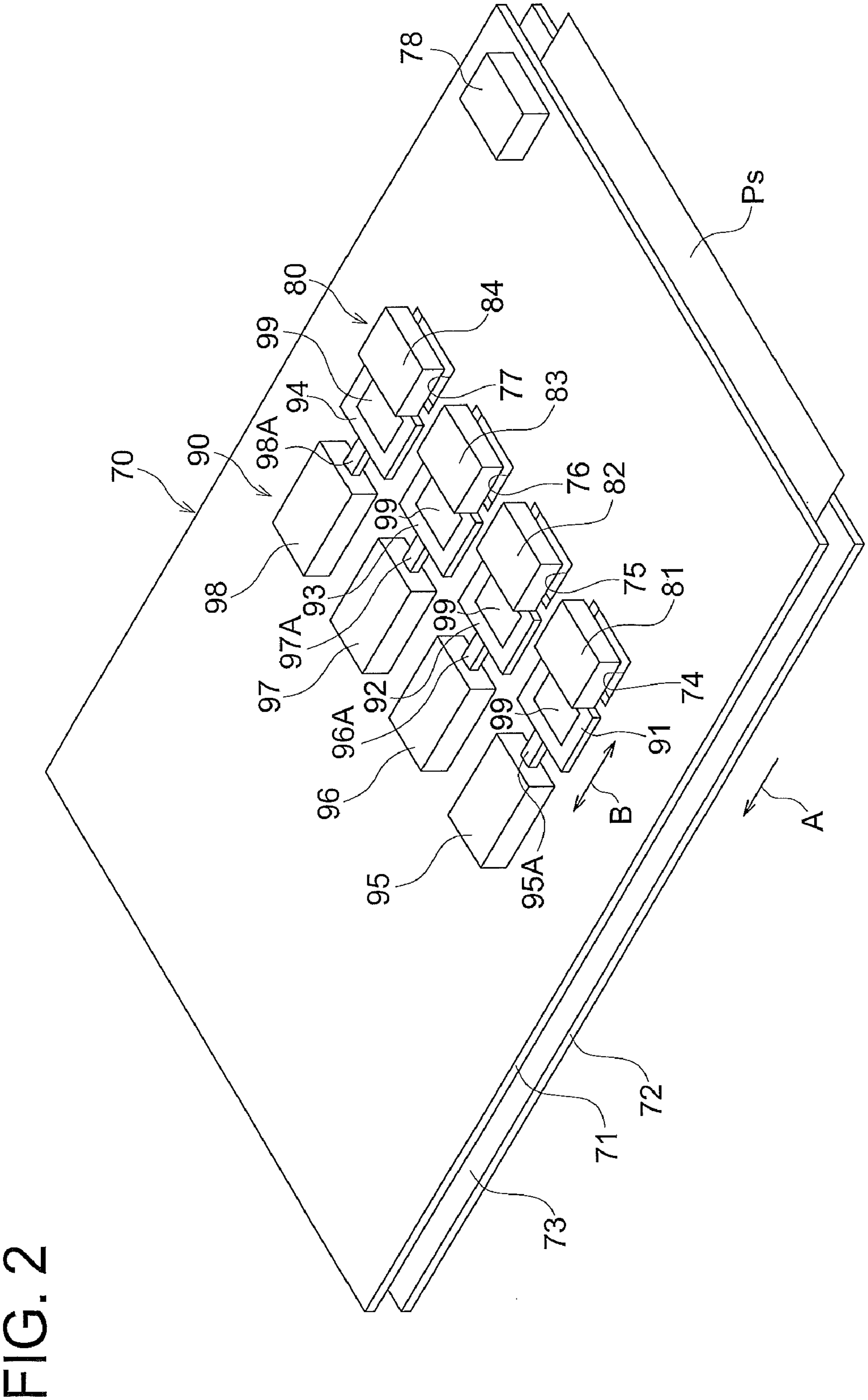
FIG. 2 is a perspective view of relevant portions showing a color density sensor and a shutter section disposed at a conveyance path of a color copying machine related to the first embodiment.

The ejection side conveyance path 70 leads and passes the sheet P having been subject to the fixing process in the fixing section 17 to the sheet ejection tray 25. As FIG. 2 shows, the ejection side conveyance path 70 is provided with a pair of bulkhead plates 71 and 72 disposed to face each other. The sheet P passes through a passing space 73 between the bulkheads 71 and 72. At an upper side or a lower side of the either one of the bulkheads 71 or 72, for example, four openings 74, 75, 76 and 77 are formed along the conveyance direction A. In the example of FIG. 2, the opening sections 74, 75, 76 and 77 are formed at an upper side of the bulkhead pale 71. The four opening sections 74, 75, 76, and 77 form an exposing area to enable light radiation onto the sheet P in the ejection side conveyance path 70. The above opening sections 74 to 77 are, for example, rectangular shape openings and the size of the opening sections are set so that the openings are shielded by the bulkhead plates 91, 92, 93 and 94. The opening section 74 to 77 are formed to be correspond to arrangement of the patches of four single colors Y, M, C and BK formed on the sheet Ps for detection. In the present embodiment, a regular sheet P is used as the sheet Ps for detection. Also, as FIG. 2 shows, at the appropriate position of the bulkhead plate 71 of the ejection side conveyance path 70, a conveyance sensor 78 is disposed to detect that the sheet Ps for detection is at a predetermined position. The conveyance sensor 78 can be a light transmission type sensor, a light reflection type sensor or various position sensors as far as the one capable of detecting the front edged of the sheet Ps for detection passing through the ejection side conveyance path 70.

The color density sensor 80 is provided with four color sensor units 81, 82, 83 and 84. Each of color density sensor units 81, 82, 83 and 84 is disposed to correspond with each of the opening sections 74, 75, 76 and 77. As FIG. 1 shows, the color sensor 80 is connected with a color sensor dive section 16.

Figure 3:
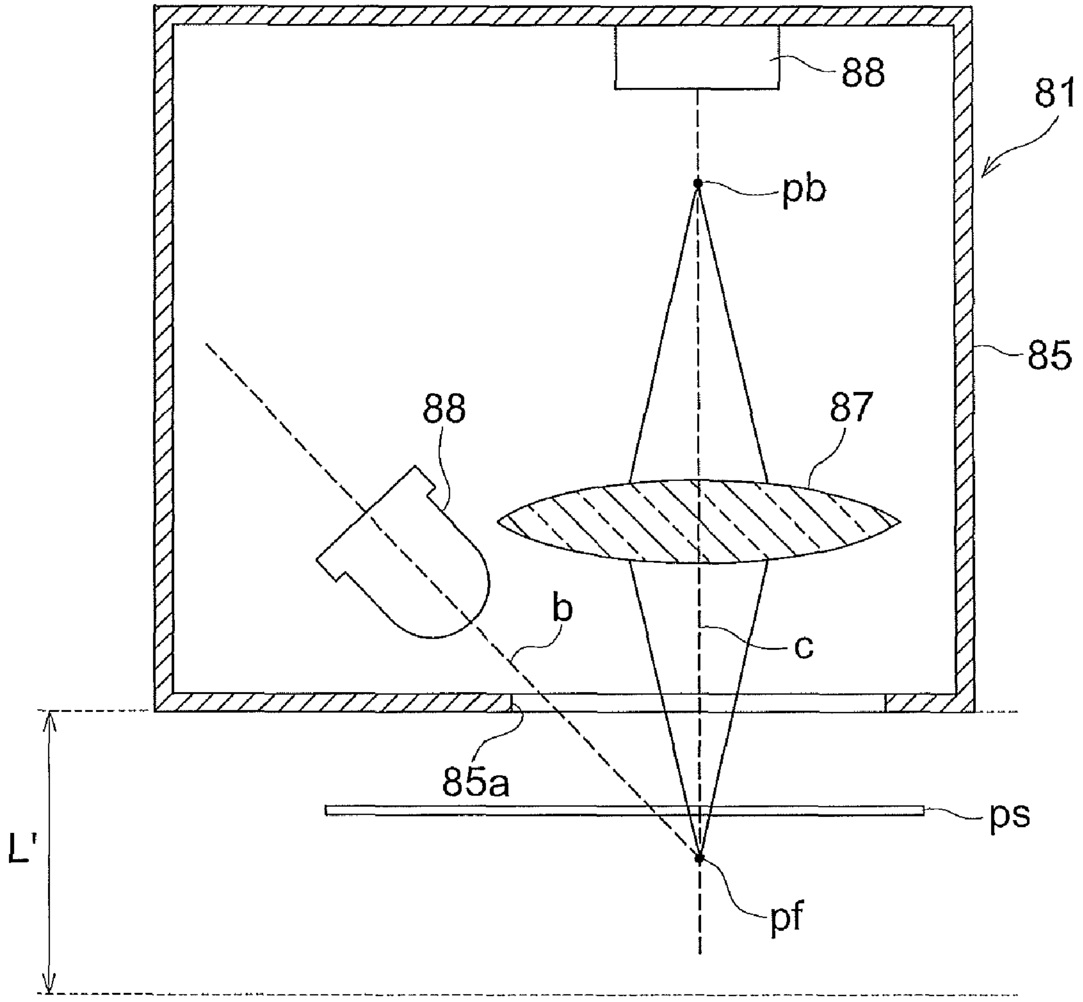
FIG. 3 is a frame format of a color density sensor unit 81 disposed in a color copying machine related to the first embodiment.

FIG. 3 shows a frame format of the color density sensor unit 81. Meanwhile, each of the color density sensor units 81, 82, 83 and 84 has almost the same configurations except that each sensor unit uses a light source having different color of light to be radiated in accordance with the color of each patch formed on the sheet PS for detection and outputs color density information for each color Y, M, C, and BK, thus only the configuration of the color sensor unit 81 will be described.

As FIG. 3 shows, the color density sensor unit 81 is provided with a light source 86, a lens 87, a photoelectric conversion element 88 as a light receiving element in a housing 85. The housing 85 is configured with a material to shield the light so as to prevent incident light unnecessary for detection. On a surface of the housing 85 facing the opening section 74, an opening section 85*a* to enable incidence and emission of light. The light source 86 is configured with, for example, a LED (Light Emitting Diode). The light sources 86 of the above color sensors 81, 82, 83 and 84 are appropriately selected in colors to enable combinations such as LEDs of single colors R, G and B or LEDs of white color. The light axis b of the light source 86 is set so that light emits from the opening section 85*a* to outside of the housing 85 with an incident angle of 45 degrees in respect to a surface of the detected subject such as unillustrated sheet Ps for detection. Meanwhile, setting of the light axes b and c are not limited to the above angle and can be changed appropriately.

The lens 87 is to converge the reflected light form the detected object and set so that the angle of the light axis c in respect to the detected object becomes 90 degrees. Meanwhile, the lens 87 has a large diameter sufficient to lead the reflected light from the detected object to the light receiving surface of the photoelectric conversion element 88. The photoelectric conversion element 88 having the large light receiving surface is used.

Figure 4:
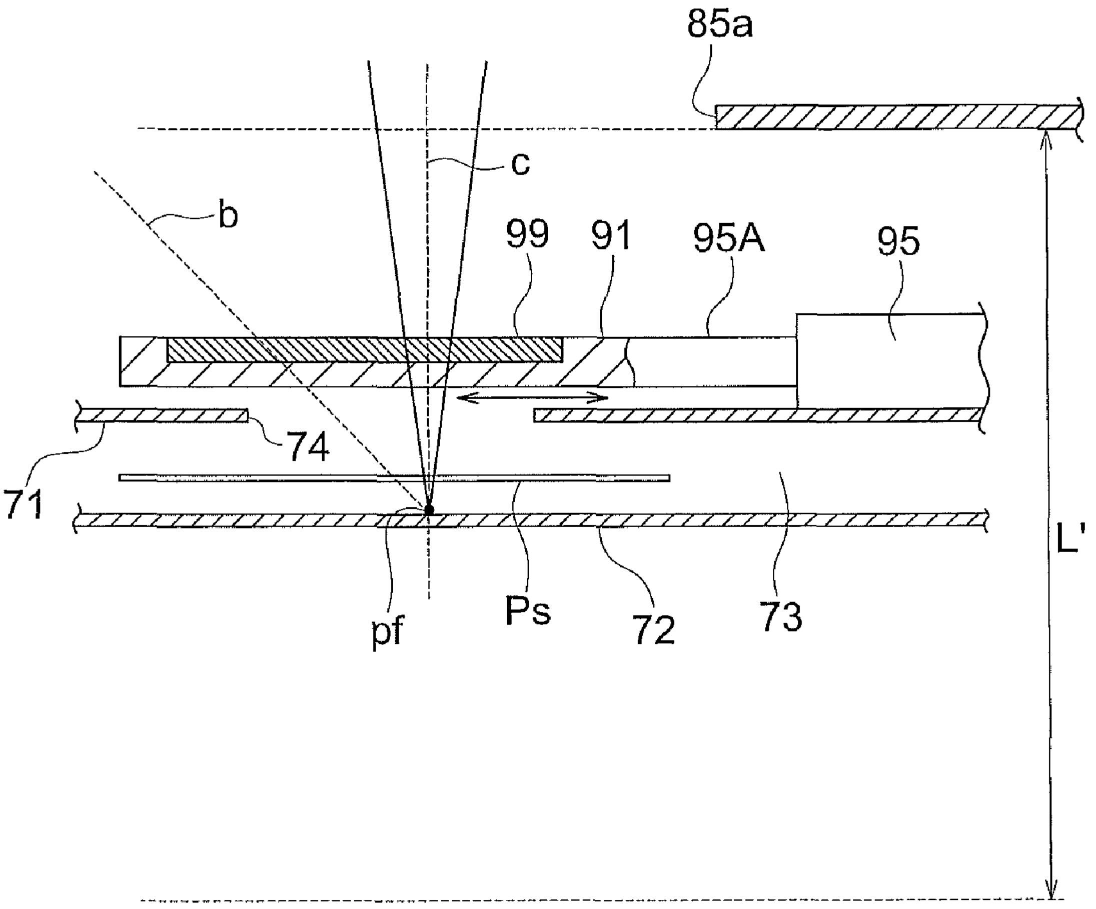
FIG. 4 is a cross sectional view showing a conveyance path and a shutter section disposed in a color copying machine related to the first embodiment.
Figure 5:
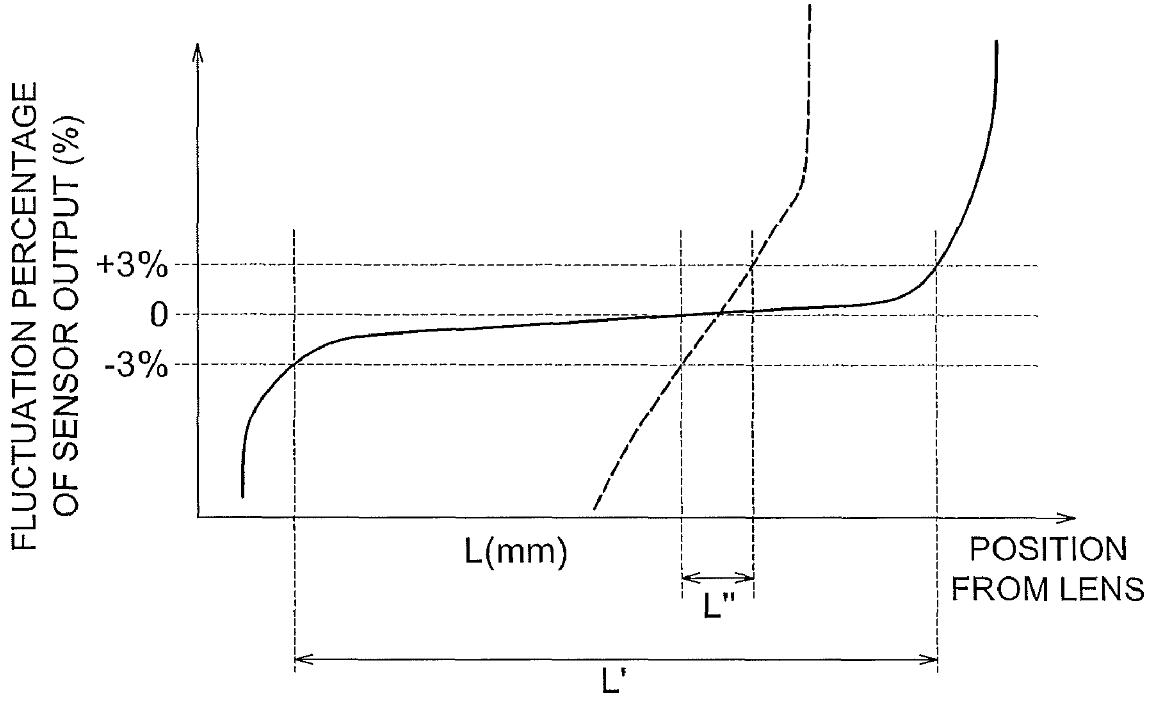
FIG. 5 is a diagram of an exemplified output result of a color density sensor indicating relations between position of a measured object and a fluctuation rate (%) of the sensor output in respect to a standard datum plane.

The light receiving surface of the photoelectric conversion element 88 is disposed behind a focus point pb which locates at an opposite side of the lens 87 with respect to the opening section 85*a* observing form the lens. A position of the detected object is between the focus point pf, which locates at the opening section 85*a* side, and the opening section 85*a*. A position of the detected object is at the lens 87 side with respect to the lens focus point pf, which locates at the opening section 85*a* side. Further in details, as FIG. 4 shows, a surface of the sheet Ps for detection representing an example of the detected object, facing the color density sensor unit 81 side is set to be located within a focus depth L' of the color density sensor unit 81, In the present embodiment, as FIG. 5 shows, the focus depth of the color density sensor unit 81 means a distance L' in the light axis c direction of the lens 87 where a sensor output of the color density sensor unit 81 fluctuates within a range of approximately ±3% from a standard value. Meanwhile, the above condition remains the same for other color density sensors 82, 83 and 84. In FIG. 5, a horizontal axis means a position from the lens 87 in the light axis direction and a vertical axis means fluctuation percentage (%) of the sensor output in respect to the predetermined standard value. Meanwhile, it is possible to use a color density sensor having a characteristic of a relatively short focus depth L" shown by broken lines in FIG. 5, however it is preferable to use a color density sensor having a relatively long focus depth shown by a solid line in FIG. 5 in aspects that an allowable range of fluctuation of the detected object is wide and a sufficient area in which the bulkhead plates 91 to 94 are disposed can be acquired.

In the present embodiment, a large refraction index of the lens 87 is set. While diffusion light reflected by the patch formed on the sheet Ps for detection reaches to the light receiving surface of the photoelectric conversion element 88 through the lens 87, by having the large refraction index such as in the present embodiment, an effect of an spherical aberration can be reduced and the a positional fluctuation of the sheet surface in the lens light axis direction can be allowed in some degree.

Next, a configuration of the shutter section 90 will be described with reference to FIG. 2 and FIG. 4. FIG. 4 shows a cross-section of a related portion where the shutter section 90 and the ejection side conveyance path 70 are cut along the conveyance direction A. The shutter section 90 is provided with four bulkhead plates 91 to 94 disposed corresponding to the color density sensor units 81 to 84, slide drive sections 95 to 98 having, for example, a solenoid as a drive source to drive each bulkhead plates 91 to 94 in a sliding manner. Meanwhile, in the present embodiment, solenoids are used as the slide drive sections 95 to 98, motors can be used as the drive source. The slide drive sections 95 to 98 are provided with slide lodes 95A to 98A which displace to appear and disappear from the slide drive sections 95 to 98 in the conveyance direction A. At free end sides of the slide lodes 95A to 98A, the bulkhead plates 91 to 94 are disposed. While FIG. 4 shows a cross-section of the bulkhead plates 91 and the slide drive section 95 in the shutter section 90, other bulkhead plates 92 to 94 and slide drive sections 96 to 98 are provided with the same configurations as that in FIG. 4.

As FIG. 2 and FIG. 4 show, a density calibration reference section 99 is disposed on a opposite surface side of the bulkhead plates 91 to 94 with respect to the ejection side conveyance path 70. The density calibration reference section 99 is configured with a member having a stable reflection coefficient and tetrafluoroethylene, fluorine contained resin in white color and a member having a surface coated with white color can be used for density calibration reference section 99. Meanwhile, in the present embodiment, while the density calibration reference section is disposed at a portion of the bulkhead plates 91 to 94 on the color density sensor side, a whole bulkhead plate can be configured as the density calibration reference section for.

The density calibration reference sections 99 disposed integrally with the bulkhead plates 91 to 94 are set so as to fall within the focus depth L' of the color density sensor units 81 in the same manner as the sheet Ps for detection conveyed in the ejection side conveyance path 70. Therefore, the patch formed on the sheet Ps for detection, and the density calibration reference sections 99 provided on the surfaces of the bulkhead plates 91 to 94 are surely detected by the color density sensor units 81, 82, 83 and 84 through color density detection without fail.

In the present embodiment, while the four density calibration reference sections 99 are white reference plates, the reference plates having deferent colors each other can be used as far as they can be substantially used as a reference of the color density correction. Also one single density calibration reference section 99, but not four reference sections, can be provided on one of the bulkhead plates 91 to 94.

In a state where the color copying machine 100 is performing regular image forming, the bulkhead plates 91 to 94 are in an ordinary state position where the bulkhead plates 91 to 94 always cover the opening sections 74 to 77. Whereby, while regular copying operation is carried out, it can prevent output characteristics from an adverse effect due to radiation of heat from the sheet P having been subject to fixing process by the fixing section 17 of the thermal pressure method. Further, taint of the color density sensor 81 to 84 by being exposed to vapor of oil and wax coming form the toner at fixing can be avoided. Therefore, detection accuracy of the color density sensor units 81 to 84 can be enhanced. Also, by enhancing the detection accuracy of the color density sensor units 81 to 84, there is realized the color copying machine 100 having a high stability of a color density of the image formed without being affected by installation environment, deterioration with age, and individual differences.

Also, in case color density detection is carried out for the sheet Ps for detection having been subject to fixing process, when the conveyance sensor 78 detects that the sheet Ps for detection is at a predetermined position, the bulkhead plates 91 to 94 are driven in the sliding manner to be displaced to a sheet detection state position where the opening sections 74 to 77 are exposed.

Meanwhile, in the present embodiment, while four bulkhead plates 91 to 94 are driven by slide drive sections 95 to 98 respectively, it can be configured that one slide drive section drives the four bulkhead plates 91 to 94 simultaneously (control method of color copying machine).

As above, the configuration of the color copying machine 100 of the present embodiment has been described. Next, control configuration of the color copying machine 100 in FIG. 1 will be described with reference to FIG. 6. In addition to a control configuration to perform an ordinary image forming, the color copying machine 100 is provided with a control configuration based on the color density detection by the color density sensor units 81 to 84.

A total control section 15 is configured with a ROM (Read Only Memory), a CPU (Central Processing Unit), a RAM (Random Access Memory) to provide data storing area for a job, a memory device and a buss. The total control section 15 performs control of the color density sensor 80, the slide drive sections 95 to 98 and the conveyance sensor 78 to detect a front edge of the sheet Ps for detection.

The total control section 15 is connected with a shutter drive section 18, the conveyance sensor 78, a color sensor drive section 16, an image forming section 60, and the fixing section 17. The shutter drive section 18 is connected with the slide drive sections 95 to 98 and provided with a driver to drive the slide drive sections 95 to 98. The color sensor drive section 16 is provided with a sub-control section 16A, a power source control circuitry 16B, and an AD conversion circuitry 16C. To the color sensor drive section 16, color sensor density units 81 to 84 are connected.

On receipt of a command from the total control section 15, the sub-control section 16A creates a reading timing of color density information through the color density sensor 80 and performs an averaging procedure of the color density data detected through the color density sensor 80. The color density data having been subject to the averaging procedure is sent to the total control section 15 and processed by an unillustrated image processing section 31 to determined image forming conditions.

Figure 7:
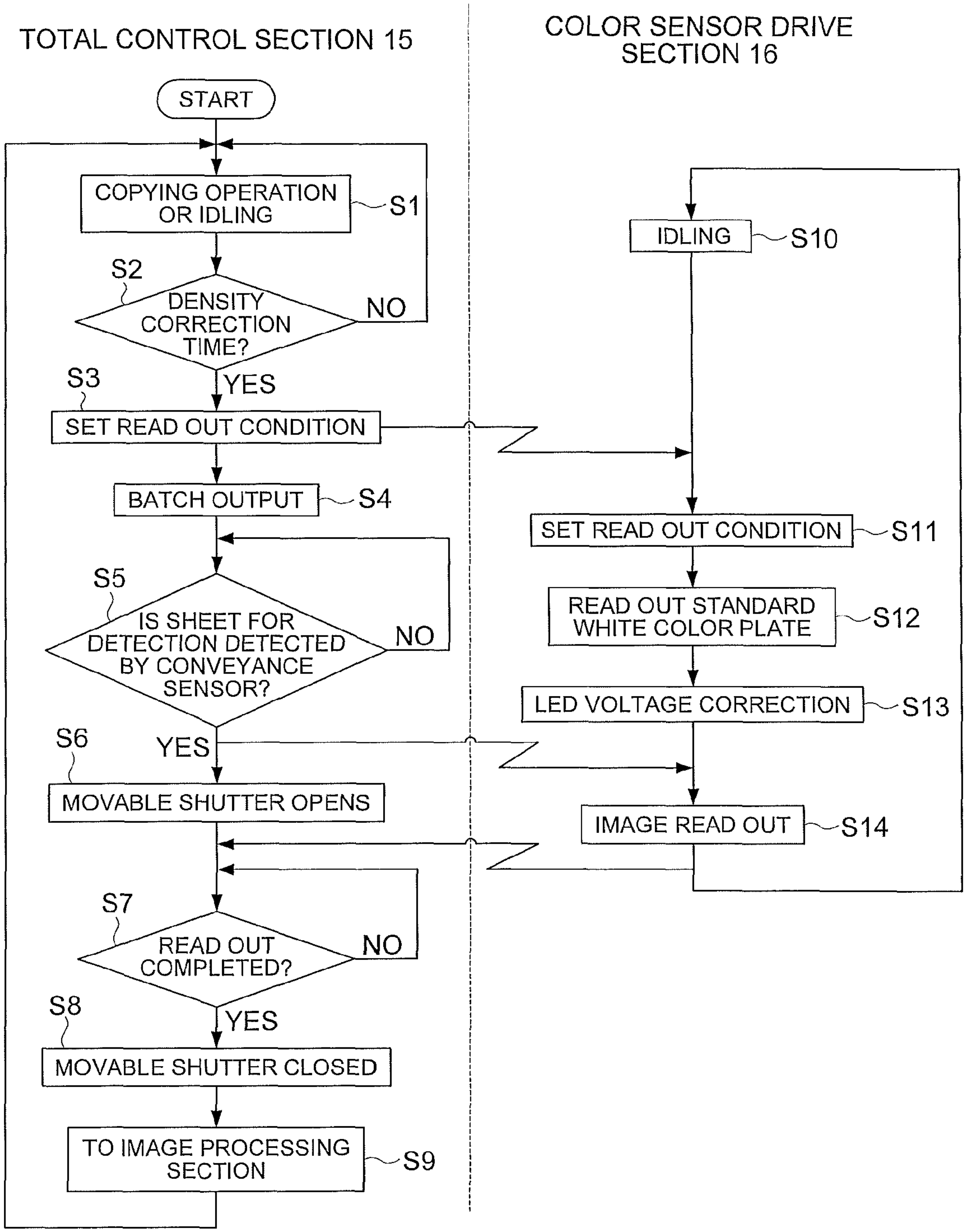
FIG. 7 is a flow chart showing an example of a control method to perform color density correction based on color density detection of a color copying machine related to the first embodiment.

Next, with reference to FIG. 7, an exemplary operation when color density detection is carried out will be described.

a) First, when the power is turned on, copying operation or idling starts (Step S1). When this occurs, the color sensor drive section 16 is in an idling state (Step 10).

b) Next, whether or not the time for color density correction comes is judged (Step S2). For example, if the number of the prints reaches at a predetermined number, for example, 1000 pieces, a predetermined time period is elapsed or a temperature in side the machine reaches at a predetermined value, it judges that color density correction time has come. In Step S2, in case it judges that the color density correction time has not yet come (Step S2: No), the flow returns to Step S1. In case the color density correction time has come, (Step S2: YES), the total control section 15 instructs to set the reading conditions of the image into the color sensor drive section 16 (Step S3). The reading condition is set by the color sensor drive section 16 which has received the instruction (Step S11). Meanwhile, the reading conditions mean number of batches to be formed on one sheet Ps for detection, number of prints, and a time span to a reading start time from a time point where the conveyance sensor is turned on and so forth. Thereafter, an intensity of light reflected by the density calibration reference section 99 is read (Step S12) so as to correct a voltage value to be supplied to LED disposed in the light source 86 of color density sensor units 81, 82, 83 and 84 (Step S13) as the calibration of the color density sensor 80.

c) Next, the total control section 15 sends a command to form patches of Y color, M color, C color and BK color on the sheet Ps for detection. On receipt of the command, the image forming section 60 forms number of patches on the sheet Ps for detection (Step S4) in accordance with the reading condition. Then, when the arrival of the sheet Ps for detection on which the patch is formed is detected by the conveyance sensor 78 (Step S5: YES), the total control section 15 instructs the color sensor drive section 16 to start reading and sends a drive command to the shutter drive section 18.

d) Next, when the shutter drive command is received form the total control section 15, the shutter drive section 18 drives the slide drive sections 95 to 98 right before the reading start time in reading condition is elapsed. Thereby, the bulkhead plate 91 to 94 slides to expose the opening sections 74 to 77 (Step S6). On the other hand, in the color sensor drive section 16, which has received the reading start commend, when the reading start time is elapsed, each color sensor unit 81 to 84 detects the color density of the patch in each color exposed in the opening sections 74 to 77 (Step S14). In accordance with the reading conditions, the color density sensor units 81 to 84 output number of color density detection results equivalent to the number of the patches corresponding to Y color, M color, C color and BK color to the color sensor drive section 16. Then the color sensor drive section 16 outputs the door density detection results to the total control section 15.

e) Thereafter, the total control section 15 receives data transmission of the color density detection results and judges completion of reading (Step S7), then sends a drive holt command to the shutter drive section 18 for the slide drive sections 95 to 98 so as to operate the bulkhead plates 91 to 94 to return an ordinary state position for covering the opening section 74 to 77 (Step S8). In the present invention, since the slide drive sections 95 to 98 are configured with solenoids, by ceasing power supply to the slide drive sections 95 to 98, the bulkhead plates 91 to 94 moves to a position to cover the opening section 74 to 77 by a spring force.

f) The color density data is sent form the total control section 15 to the image processing section 31 where the image forming conditions are set (Step S9).

By the above control operation, color density correction based on color density data is carried out in the image processing section 31, which is reflected for subsequent image forming procedures.

As above, the color copy machine 100 related to the first embodiment and the control method thereof have been described. According to the present embodiment, by shielding vapor of oil and wax form the surface of the sheet having passed through the fixing section 17 of thermal pressure method, exposure of the color density sensor 80 in the vapor and effect of heat from the sheet P side are avoided. Thus, taint of the color density sensor 80 and unstable output characteristic due to fluctuation of temperature can be suppressed. Therefore, stable performance of the color density sensor 80 can be preserved. Also, since the color density sensor 80 can detect density calibration reference section 99 and the density information thereof can be used, for example, white color of the sheet is not necessary to be used as the reference section, and highly accurate density detection without being affected by the sheet P is possible. Also, by enhancing the detection accuracy as above, the color copying machine 100 having high stability in color density of the formed image without being affected by installation environment, deterioration with age and individual differences can be realized. In the above, the density calibration reference section 99 is not regularly exposed in the vapor, since the density calibration reference section 99 is located at the color density sensor 80 side of the bulkhead plates 91 to 94, thus deterioration of the quality as the reference section can be suppressed. Meanwhile, since the density calibration reference section 99 is disposed at least at a part of the bulkhead plates 91 to 94, number of parts can be reduced and a low cost configuration can be realized.

Also, the conveyance path 73 is provided with at least a dividing wall 71 at the color density sensor 80 side and the exposure area is configured with the opening section 74 formed on the dividing wall plate 71. The bulkhead plates 91 to 94 having a sufficient size to cover the opening section 74 move to a sheet detection state position so as to expose the opening section 74 when the color density sensor 80 detects the color density of the patch of the sheet Ps for detection, and move to a regular state position so as to cover the opening section 74 in a regular state as well as when the color density of the density calibration reference section 99 is detected. Whereby, by the bulkhead plates 91 to 94 to cover the opening section 74 formed on the dividing wall plate 71, heat and vapor of wax and oil form the sheet P passing through the conveyance path 73 is interrupted.

Second Embodiment

Figure 6:
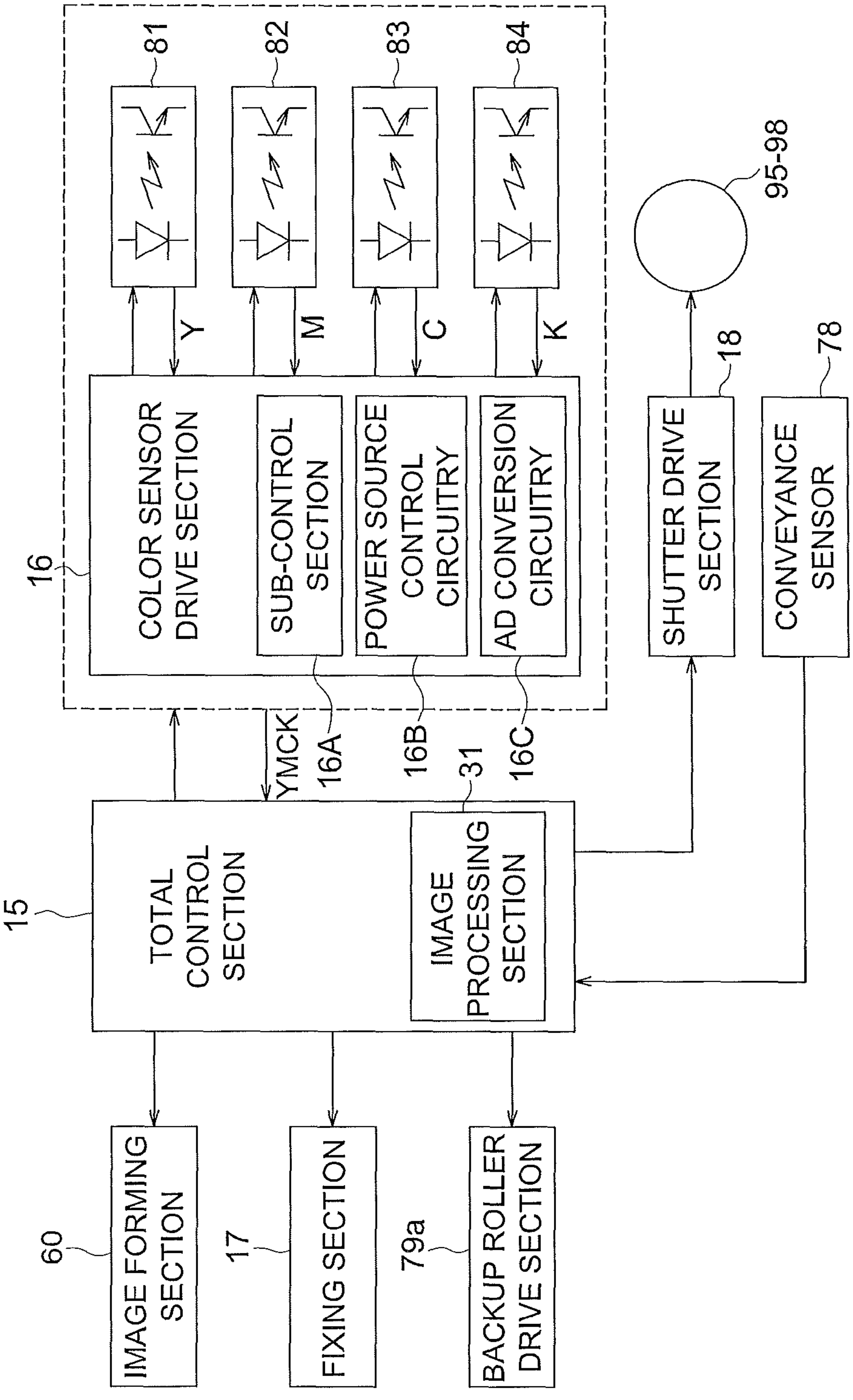
FIG. 6 is a block diagram showing a control configuration to perform color density correction based on color density detection of a color copying machine related to the first embodiment.
Figure 8:
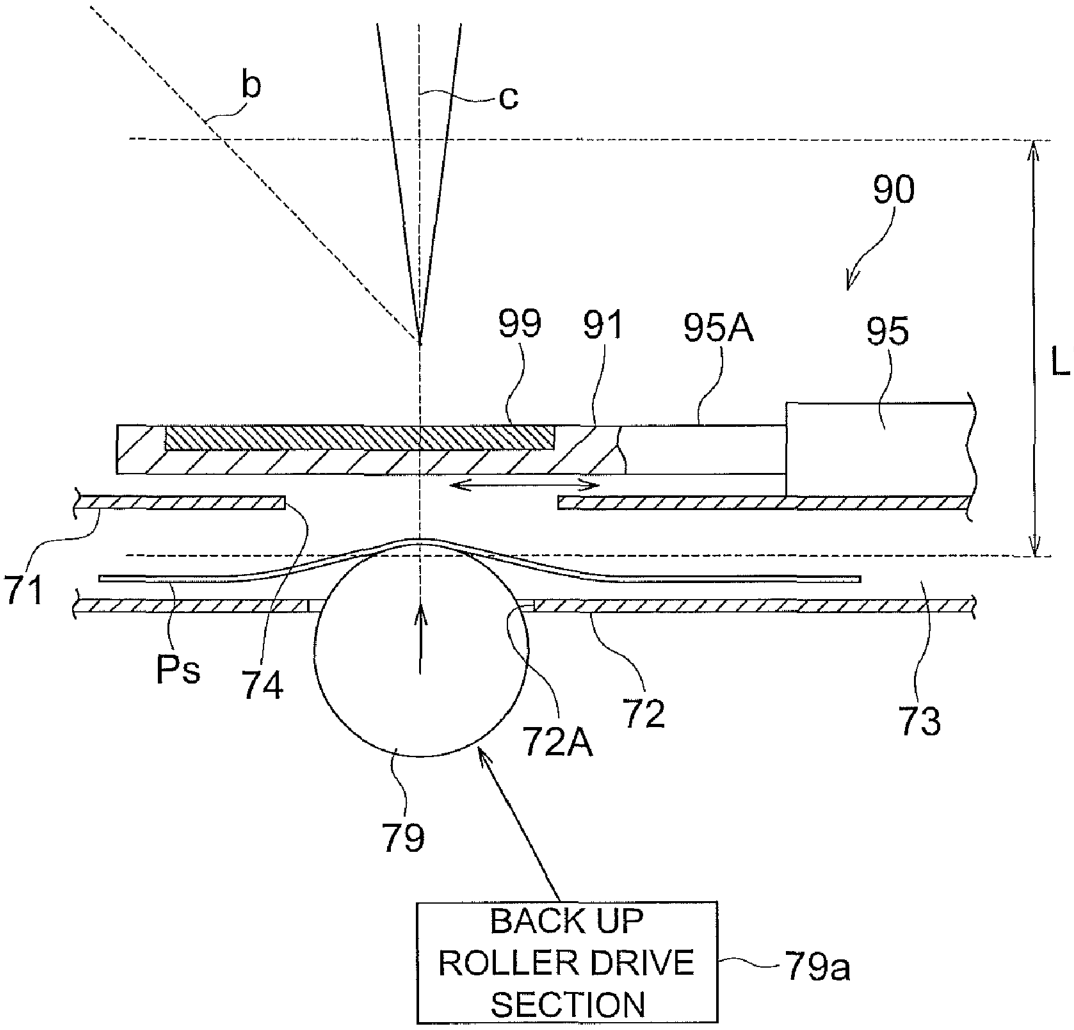
FIG. 8 is a cross-sectional view showing relevant portions of a color copying machine related to a second embodiment of the present invention.

FIG. 8 is a cross-sectional view showing related portions of the color copying machine related to the second embodiment. In the second embodiment, on the dividing wall plate 72 of the ejection side conveyance path 70 disposed on the color copying machine 100 of the first embodiment, an opening section 72 having substantially the same width as that of the sheet Ps for detection is formed and a backup roller 79 is disposed. In FIG. 6, the total control section 15 is connected to the backup roller drive section 79*a*. Meanwhile, it is configured that at the regular state, the sheet P passing through the ejection side conveyance path 70 passes outside of the focus depth L' of the color density sensor units 81, 82, 83 and 84, and only when the color density detection is carried out, the sheet Ps for detection is risen by the backup roller 79 to be pushed up so that the sheet Ps for detection falls within the focus depth L' of the color density sensor unit. Specifically, right before the reading elapsed time elapses after the sheet Ps for detection is detected by the conveyance sensor 78, the backup roller 79 is driven by the backup roller drive section 79*a* connected to the total control section 15 to be located at an upper side. Meanwhile, as FIG. 6 shows, the backup roller drive section 79*a* is connected to the total control section 15 so that operation of the backup roller drive section 79*a* is controlled by the total control section 15. Owing to the above configuration, a tension force is applied to the portion of the sheet where the backup roller 79 pushes up by a weight of the sheet Ps for detection, thus fluctuation of the sheet Ps for detection is suppressed. As the result, positioning of the portion where the patch is formed on the sheet Ps for detection is ensured thus the color density detection can be carried out in a stable state, and the accuracy of the color density data is enhanced.

Meanwhile, since the other configurations of the color copying machine related to the second embodiment are the same, descriptions thereof are omitted.

As above, according to the second embodiment, the backup roller 79 pushes the reverse surface side of the patch forming area of the sheet Ps for detection to bring the patch within the focus depth of the color density sensor 80, whereby even if the entire ejection side conveyance path 70 is not located within the focus depth of the color density sensor 80, the patch exposing form the opening section 74 can be located within the focus depth L' (other embodiment).

As above, while the embodiments have been described, it is understand that the descriptions and the drawings reflecting portions of disclosed examples do not limit the present invention. For the person skilled in the art, alternative embodiments and operation technologies will be apparent form the present disclosure.

In the color copying machines related to the first and second embodiments, configurations provided with a gamma curve measuring section and other measuring sections and control sections are possible.

While the above first and second embodiments have been described with the examples applied to the color copying machine, the present invention can be applied to color printers, facsimile machines and multiple peripherals other than the color copying machines. Further, in the above first and second embodiments, while the color copying machines of electrophotographic method have been described, the present invention can be applied to color printers of inkjet method.

According to the color image forming apparatus and the control method thereof, since deterioration with age and characteristic fluctuation of the color density sensor can be suppressed, color density of the output image can be stabilized. Also, highly accurate density correction of the color density sensor without being affected by the sheet is possible, also by reducing number of the parts, low cost can be realized.

What is claimed is:

1. An image forming apparatus to carry out color density correction by detecting a toner image for density detection formed on a sheet by a color density sensor, comprising:

a color image forming section to form the toner image for density detection;

a fixing section to fix the toner image for density detection formed by the color image forming section by heat;

a conveyance path to pass the sheet having been subject to a fixing process by the fixing section, having an exposure area though which a color density sensor side of the sheet is exposed;

a bulkhead plate having a density calibration reference section at least at a portion of the color density sensor side; a bulkhead plate drive section to drive the bulkhead plate so as to displace between a regular state position to cover the exposure area and a sheet detection state position to expose the exposure area, wherein the bulkhead plate locates at the sheet detection state position so that the color density sensor detects the toner image for density detection; and a conveyance sensor to detect the sheet on which the toner image for density detection is formed, wherein the bulkhead plate drive section moves the bulkhead plate to the sheet detection state position based on a detection result of the conveyance sensor, wherein the color density sensor comprises a light emitting element disposed outside the conveyance path to radiate light towards the sheet, and a light receiving element to receive reflected light caused by radiation of the light, so as to detect color density of the toner image for density detection on the sheet in the exposure area when the bulkhead plate is in the sheet detection state position, and to detect density of the density calibration reference section when the bulkhead is in the regular state position.

2. The image forming apparatus of claim 1, wherein the toner image for density detection located in the exposure area and the density calibration reference section in the regular state position are displace within a focus depth of the color density sensor.

3. The image forming apparatus of claim 1, wherein the conveyance path includes at least a dividing wall plate located at a color density sensor side, and the exposure area is an opening section formed on the dividing wall plate.

4. The image forming apparatus of claim 1, further comprising a control section to judge completion of detecting the toner image for density detection by the color density sensor, wherein the bulkhead plate drive section moves the bulkhead plate to the regular state position based on a judgment result of the control section.

5. The image forming apparatus of claim 1, further comprising a backup roller to bring the toner image for density detection within a focus depth of the color density sensor by pushing the sheet on which the toner image for density detection is formed when color density of the toner image for density detection is detected by the color density sensor.

6. A control method of a color image forming apparatus, to carry out color density correction by detecting a toner image for density detection by a color density sensor, comprising steps of:

forming a toner image for density detection on a sheet by an image forming section;

fixing the toner image for density detection formed on the sheet by heat by a fixing section;

exposing the color density sensor side of the sheet from an exposure area provided at a conveyance path to pass the sheet on which the image for density detection is fixed by the fixing section;

driving a bulkhead plate having a density calibration reference section in at least a portion on a color density sensor side thereof so as to move between an regular state position to cover the exposure area and a sheet detection state position to expose the exposure position, wherein at least when arrival of the sheet, on which the toner image for density detection is fixed by the fixing section, in the conveyance path is detected by a conveyance sensor, the bulkhead plate is moved to the sheet detection state position by a bulkhead plate drive section based on a detection result of the conveyance sensor so that the color density sensor detects the toner image for density detection;

emitting light towards the sheet from a light emitting element disposed outside the conveyance path so that the light reflected by the sheet is received by a light receiving element;

detecting color density of the toner image for density detection on the sheet in the exposure area when the bulkhead plate is in the sheet detection state position by the color density sensor so as to read color density information of the toner image for density detection in a position corresponding to the exposure area; and detecting color density of the density calibration reference section when the bulkhead plate is in the regular state position by the color density sensor so as to read color density information of the density calibration reference section based on a command to carry out color density correction.

7. The control method of the color image forming apparatus of claim 6, further comprising a step of correcting color density based on the color, density information of the density calibration reference section and the color information of the toner image for density detection.

* * * * *